United States Patent
Lee et al.

(10) Patent No.: US 9,515,790 B2
(45) Date of Patent: Dec. 6, 2016

(54) METHOD FOR REDUCING INTER-CELL INTERFERENCE IN COOPERATIVE MULTI-CELL WIRELESS COMMUNICATION SYSTEM, AND APPARATUS FOR SAME

(71) Applicant: LG ELECTRONICS INC., Seoul (KR)

(72) Inventors: Seungmin Lee, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/375,116

(22) PCT Filed: Feb. 28, 2013

(86) PCT No.: PCT/KR2013/001644
§ 371 (c)(1),
(2) Date: Jul. 28, 2014

(87) PCT Pub. No.: WO2013/129871
PCT Pub. Date: Sep. 6, 2013

(65) Prior Publication Data
US 2014/0370908 A1    Dec. 18, 2014

Related U.S. Application Data

(60) Provisional application No. 61/604,532, filed on Feb. 29, 2012.

(51) Int. Cl.
*H04W 72/00* (2009.01)
*H04L 5/00* (2006.01)
(Continued)

(52) U.S. Cl.
CPC ............. *H04L 5/0032* (2013.01); *H04B 7/024* (2013.01); *H04W 52/244* (2013.01)

(58) Field of Classification Search
CPC ... H04L 5/0032; H04W 52/244; H04B 7/024
USPC .................. 455/512, 501, 436, 62, 522, 453
See application file for complete search history.

(56) References Cited

U.S. PATENT DOCUMENTS

| | | | |
|---|---|---|---|
| 5,507,008 A * | 4/1996 | Kanai et al. .................. 455/512 |
| 2004/0047312 A1 | 3/2004 | Muszynski et al. |

(Continued)

FOREIGN PATENT DOCUMENTS

| | | |
|---|---|---|
| CN | 101137236 | 3/2008 |
| CN | 101860912 | 10/2010 |

(Continued)

OTHER PUBLICATIONS

PCT International Application No. PCT/KR2013/001644, Written Opinion of the International Searching Authority dated Jun. 21, 2013, 14 pages.

(Continued)

*Primary Examiner* — Martin Mushambo
(74) *Attorney, Agent, or Firm* — Lee Hong Degerman Kang Waimey

(57) ABSTRACT

The present invention relates to a method for reducing inter-cell interference in a wireless communication system and to an apparatus for same. More specifically, a method for reducing the inter-cell interference between serving cells in the cooperative multi-cell wireless communication system comprises the steps of: receiving from an adjacent cell interference information on a specific wireless resource region; and reducing interference with respect to the specific wireless resource region based on the interference information, wherein the specific wireless resource region is a wireless resource region that the serving cell uses by changing the purpose of a wireless resource.

20 Claims, 11 Drawing Sheets

(51) Int. Cl.
*H04B 7/02* (2006.01)
*H04W 52/24* (2009.01)

(56) References Cited

U.S. PATENT DOCUMENTS

| | | | | |
|---|---|---|---|---|
| 2008/0057996 | A1* | 3/2008 | Sung | H04W 52/146 |
| | | | | 455/522 |
| 2009/0180435 | A1 | 7/2009 | Sarkar | |
| 2009/0249153 | A1* | 10/2009 | Zhang | H04L 1/1887 |
| | | | | 714/748 |
| 2010/0144381 | A1* | 6/2010 | Park et al. | 455/501 |
| 2010/0210214 | A1* | 8/2010 | Pawar | H04W 72/082 |
| | | | | 455/63.1 |
| 2011/0051681 | A1* | 3/2011 | Ahn | H04L 5/0094 |
| | | | | 370/330 |
| 2011/0053598 | A1* | 3/2011 | Ahluwalia | 455/436 |
| 2011/0211503 | A1 | 9/2011 | Che et al. | |
| 2011/0235602 | A1* | 9/2011 | Ji | H04L 5/0007 |
| | | | | 370/329 |

FOREIGN PATENT DOCUMENTS

| | | |
|---|---|---|
| EP | 2381709 | 10/2011 |
| KR | 10-2010-0081913 | 7/2010 |
| KR | 10-2011-0055014 | 5/2011 |

OTHER PUBLICATIONS

PCT International Application No. PCT/KR2013/001644, Written Opinion of the International Searching Authority dated Jun. 21, 2013, 1 page.
State Intellectual Property Office of the People's Republic of China Application Serial No. 201380010542.0, Office Action dated Sep. 18, 2016, 8 pages.

* cited by examiner

FIG. 2
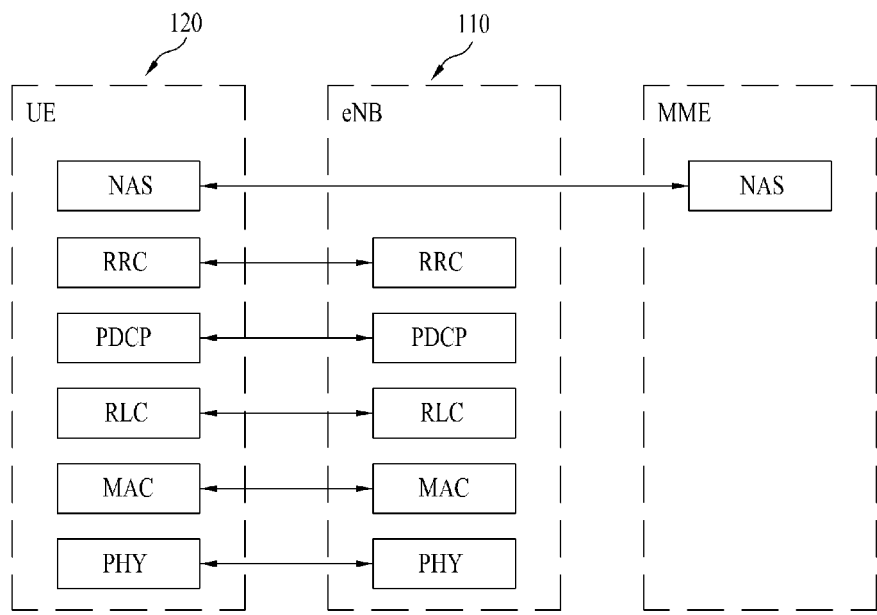
(a) Control-plane protocol stack
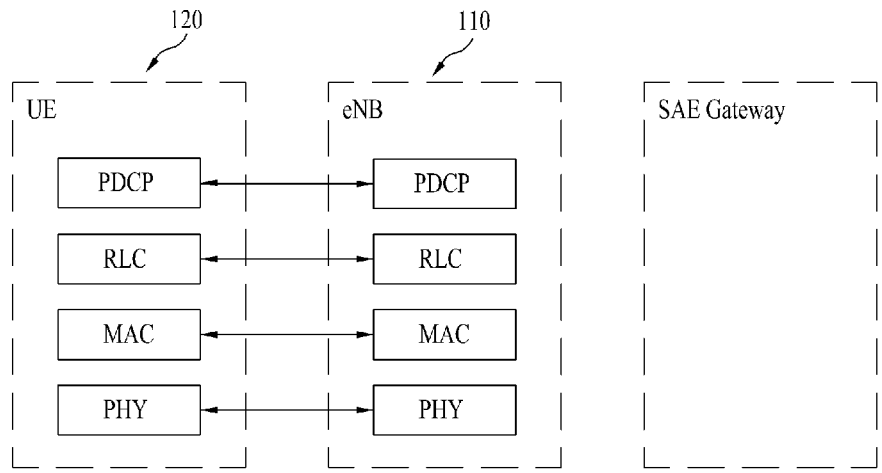
(b) User-plane protocol stack FIG. 9
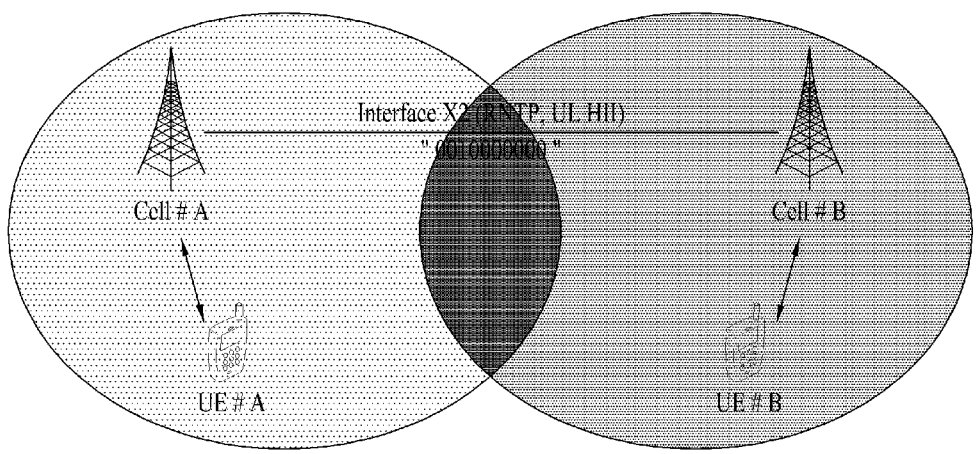
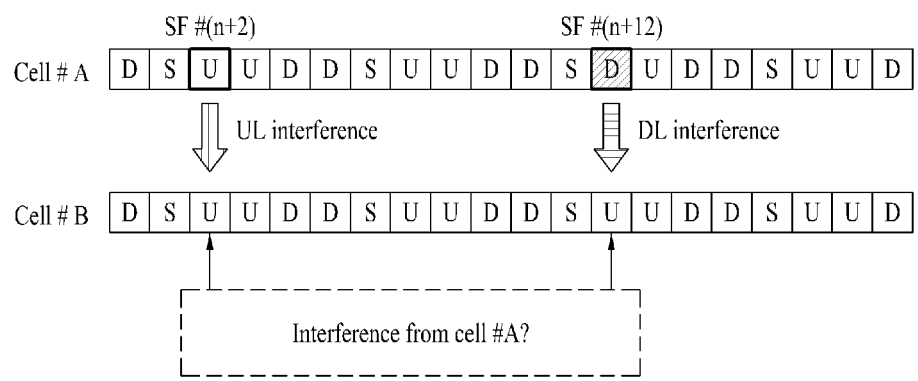
☐ Point where change probability of radio resource usage is high
▨ Point where radio resource usage is changed (UL → DL)

METHOD FOR REDUCING INTER-CELL INTERFERENCE IN COOPERATIVE MULTI-CELL WIRELESS COMMUNICATION SYSTEM, AND APPARATUS FOR SAME

CROSS-REFERENCE TO RELATED APPLICATIONS

This application is the National Stage filing under 35 U.S.C. 371 of International Application No. PCT/KR2013/001644, filed on Feb. 28, 2013, which claims the benefit of U.S. Provisional Application Ser. No. 61/604,532, filed on Feb. 29, 2012, the contents of which are hereby incorporated by reference herein in their entirety.

TECHNICAL FIELD

The present invention relates to wireless communication system, and more particularly, to a method for reducing inter-cell interference in a cooperative multi-cell wireless communication system and an apparatus for the same.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention devised to solve the conventional problem is to provide a method for reducing inter-cell interference in a cooperative multi-cell wireless communication system and an apparatus for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one aspect of the present invention, a method for reducing inter-cell interference of a serving cell in a cooperative multi-cell wireless communication system comprises the steps of receiving interference information on a specific radio resource region from a neighboring cell; and reducing interference with respect to the specific radio resource region on the basis of the interference information, wherein the specific radio resource region is a radio resource region used by the serving cell by changing usage of a radio resource.

Moreover, the method may further comprise the step of transmitting transmission power information for the specific radio resource region to the neighboring cell. Preferably, the transmission power information may include information on a threshold value set in accordance with interference features of the specific radio resource region.

Moreover, the interference information may be UpLink Interference Overload Indication (UL IOI) that includes information indicating interference level in the specific radio resource region.

Moreover, the interference information may include information on the amount of interference for allowing the neighboring cell to perform uplink communication in the specific radio resource region. Preferably, the interference information may be received from a neighboring cell that performs uplink communication.

Moreover, the interference information may include information indicating uplink or downlink on communication performed by the neighboring cell in the specific radio resource region.

Moreover, the interference information may include information on the number of times of communication performed by the neighboring cell in a specific time interval, and the number of times of communication may be for at least one of uplink communication and downlink communication.

Moreover, the interference information may be information indicating a specific time on a time period corresponding to the specific radio resource region.

Moreover, the step of reducing interference may be performed by controlling a transmission power configured with respect to the specific radio resource region.

To solve the aforementioned technical problems, according to another aspect of the present invention, a serving cell for reducing inter-cell interference in a cooperative multi-cell wireless communication system comprises a radio frequency (RF) unit; and a processor, wherein the processor is configured to receive interference information on a specific radio resource region from a neighboring cell and reduce interference with respect to the specific radio resource region on the basis of the interference information, and the specific radio resource region is a radio resource region used by the serving cell by changing usage of a radio resource.

Advantageous Effects

According to the present invention, in the case that radio resources are dynamically changed in accordance with system load in the wireless communication system, inter-cell interference for the corresponding radio resources may be reduced, whereby efficient communication may be performed.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating structures of a control plane and a user plane of a radio interface protocol between a user equipment and an E-UTRAN based on the 3GPP radio access network standard;

FIG. 9 is a diagram illustrating problems when usage of a specific radio resource is dynamically changed in accordance with system load;

BEST MODE FOR CARRYING OUT THE INVENTION

Figure 1:
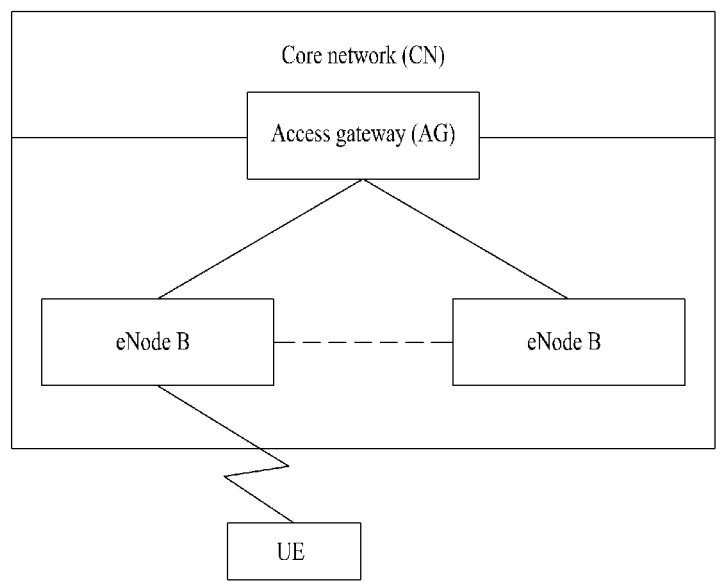
FIG. 1 is a diagram illustrating a network structure of an Evolved Universal Mobile Telecommunications System (E-UMTS) which is an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
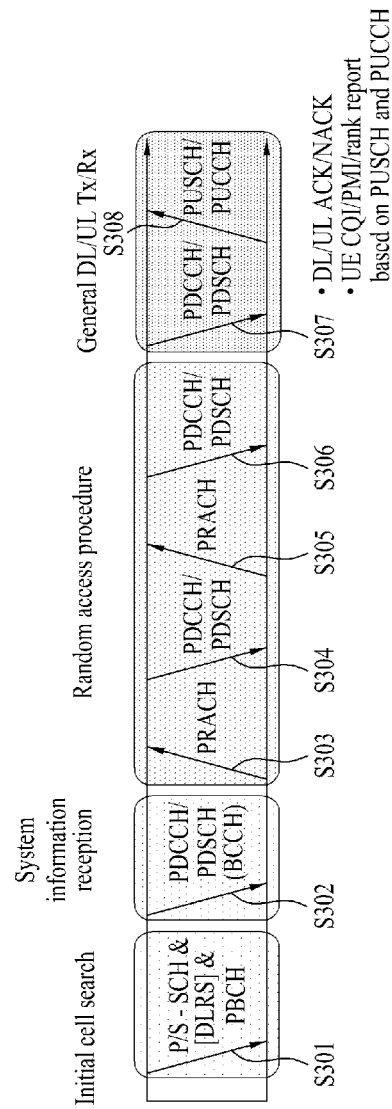
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
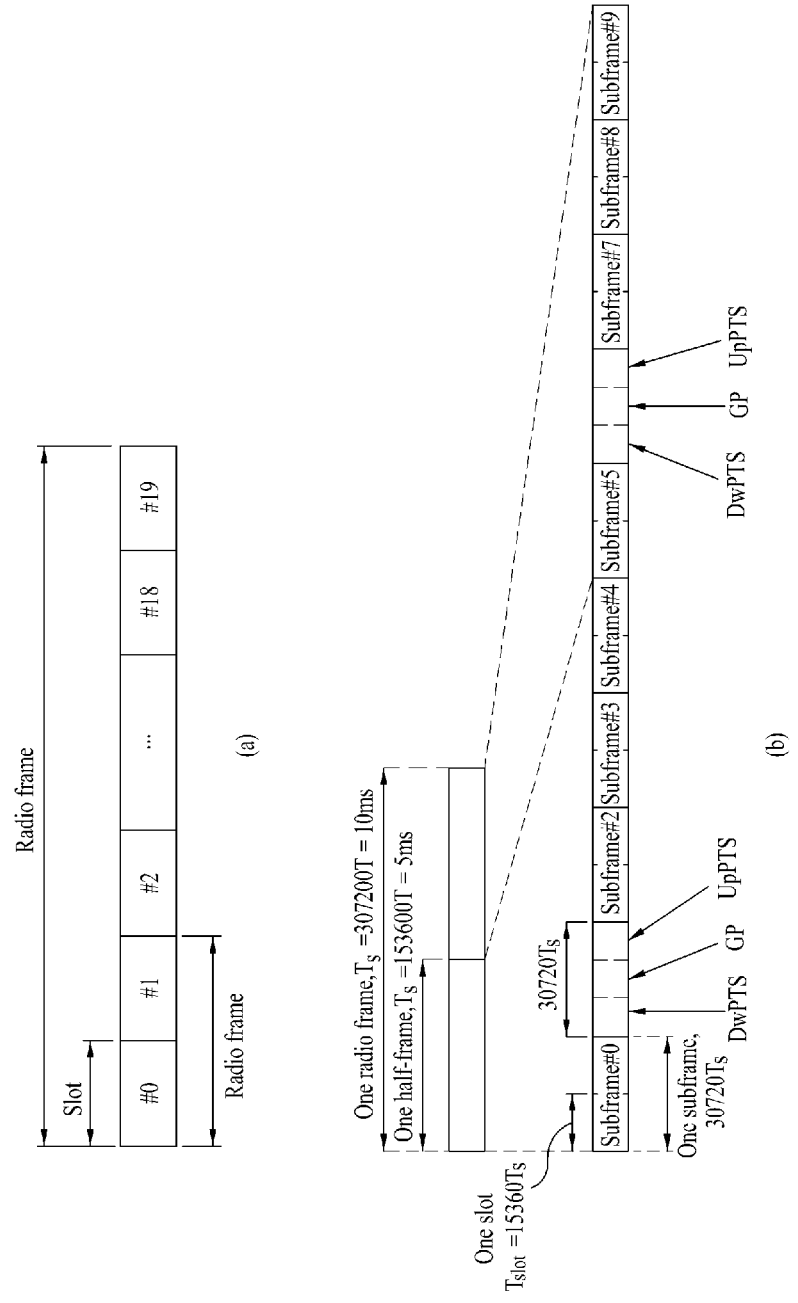
FIG. 4 is a diagram illustrating a structure of a downlink radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
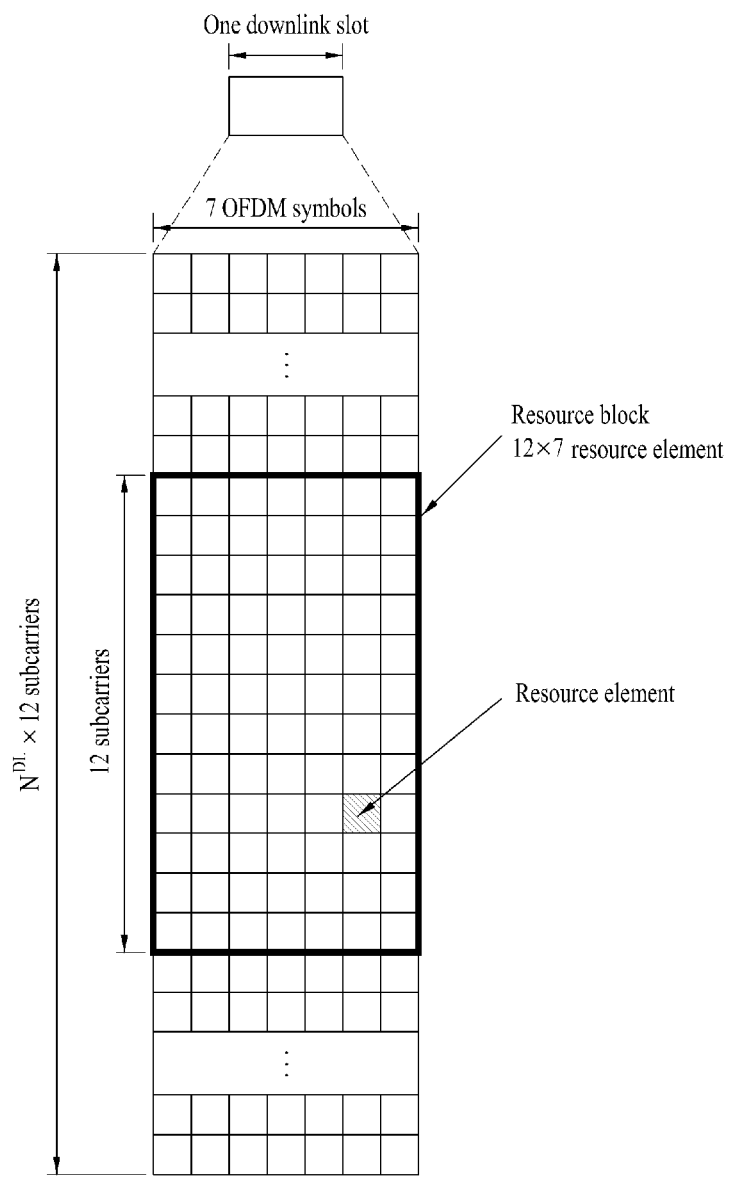
FIG. 5 is a diagram illustrating an example of a resource grid of a downlink slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The number $N_{RB}^{DL}$ of resource blocks included in the downlink slot depends on a downlink transmission bandwidth configured in the cell.

Figure 6:
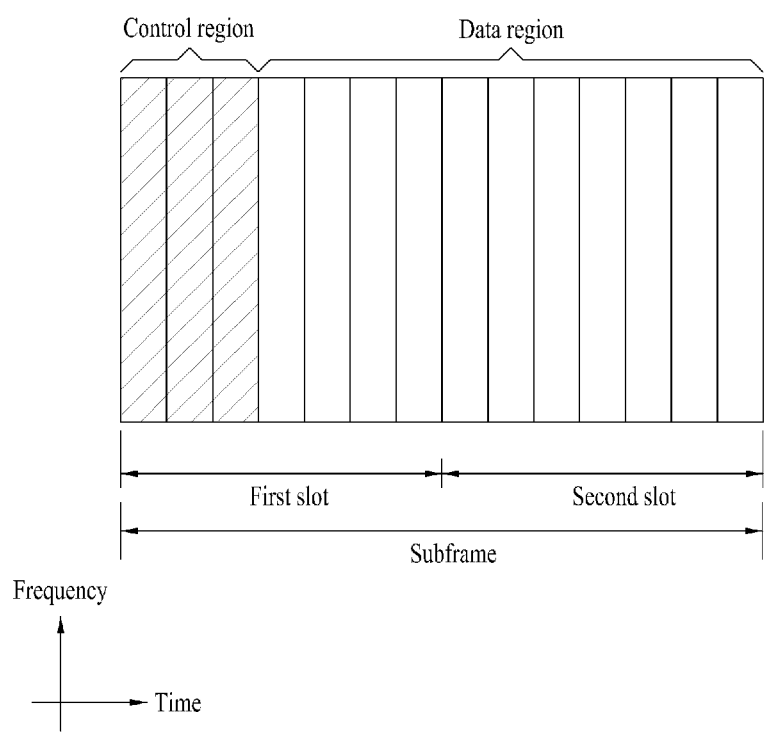
FIG. 6 is a diagram illustrating a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission power control commands of individual user equipments (UEs) within a random user equipment group, transmission power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
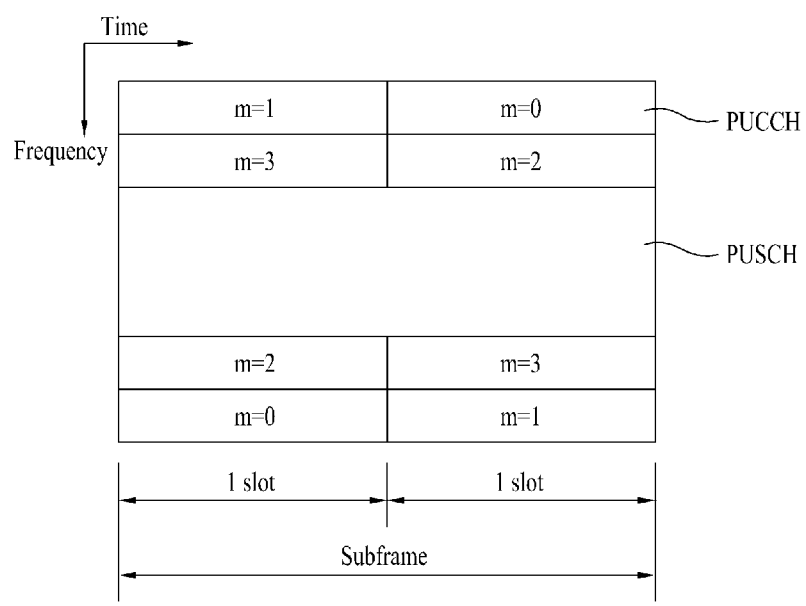
FIG. 7 is a diagram illustrating a structure of an uplink subframe used in an LTE.

FIG. 7 is a diagram illustrating a structure of an uplink subframe used in the LTE system.

Referring to FIG. 7, the uplink subframe includes a plurality of slots (for example, two). Each slot may include a plurality of SC-FDMA symbols, wherein the number of SC-FDMA symbols included in each slot is varied depending on a cyclic prefix (CP) length. The uplink subframe is divided into a data region and a control region in a frequency domain. The data region includes a PUSCH, and is used to transmit a data signal such as voice. The control region includes a PUCCH, and is used to transmit uplink control information (UCI). The PUCCH includes RB pair located at both ends of the data region on a frequency axis, and performs hopping on the border of the slots.

The PUCCH may be used to transmit the following control information.

SR (Scheduling Request): is information used to request uplink UL-SCH resource. The SR is transmitted using an on-off keying (OOK) system.

HARQ ACK/NACK: is a response signal to a downlink data packet on the PDSCH. It represents whether the downlink data packet has been successfully received. ACK/NACK 1 bit is transmitted in response to a single downlink codeword (CW), and ACK/NACK 2 bits are transmitted in response to two downlink codewords.

CSI (Channel State Information): is feedback information on a downlink channel. The CSI includes CQI (Channel Quality Indicator), and MIMO (Multiple Input Multiple Output) related feedback information includes a rank indicator (RI), a precoding matrix indicator (PMI), a precoding type indicator (PTI), etc. 20 bits are used per subframe.

The quantity of the uplink control information (UCI) that may be transmitted from the user equipment for the subframe depends on the number of SC-FDMA symbols available for control information transmission. The SC-FDMA symbols available for control information transmission mean the remaining SC-FDMA symbols except for SC-FDMA symbols for reference signal transmission for the subframe, and the last SC-FDMA symbol of the subframe is excluded in case of the subframe for which a sounding reference signal (SRS) is set. The reference signal is used for coherent detection of the PUCCH.

Hereinafter, Cooperative Multipoint Transmission/Reception (CoMP) will be described.

The post-LTE-A system considers a system that enhances system throughput through cooperation between cells. This system will be referred to a Cooperative Multipoint Transmission/Reception (CoMP) system. The CoMP system means a communication system that two or more base stations, access points or cells perform communication with the user equipment in cooperative with one another to effectively perform communication between a specific user equipment and the base station, access point or cell. In this specification, the base station, the access point, or the cell may be used to refer to the same thing.

Generally, in a multi-cell environment where a frequency reuse factor is 1, throughput of the user equipment located at the cell edge and average sector throughput may be reduced due to inter-cell interference (ICI). In order to reduce ICI, a method for enabling a user equipment located at the cell edge in an environment restricted by interference to have proper throughput by using a simple passive scheme such as fractional frequency reuse (FFR) through user equipment specific power control has been applied to the LTE system according to the related art. However, it may be more preferable to reduce ICI or allow the user equipment to reuse ICI as a desired signal than to reduce use of frequency resources per cell. To this end, a CoMP transmission scheme may be used.

Figure 8:
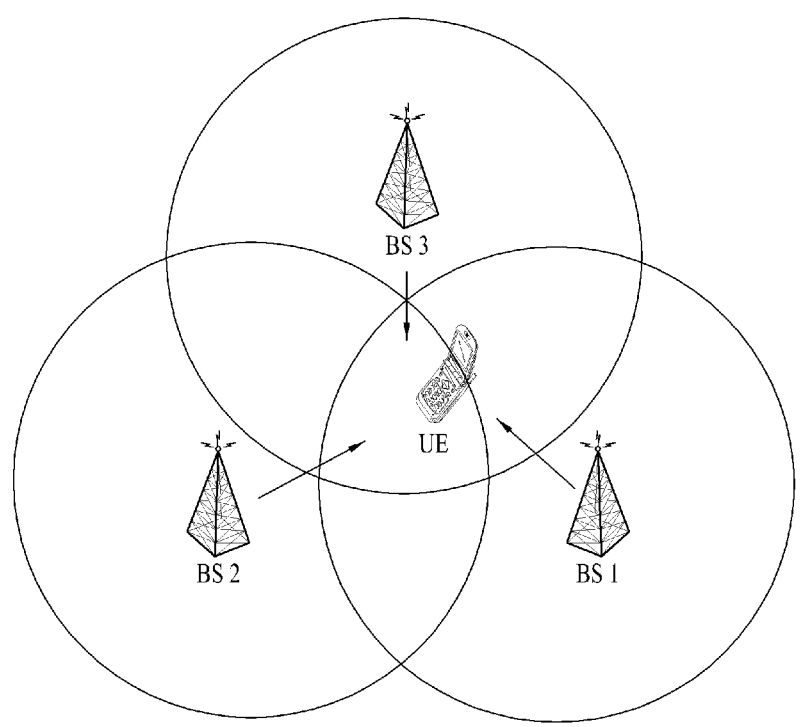
FIG. 8 is a diagram illustrating an example of performing CoMP.

FIG. 8 is a diagram illustrating an example of performing CoMP. Referring to FIG. 8, the wireless communication system includes a plurality of base stations BS1, BS2 and BS3, which perform CoMP, and a user equipment. The plurality of base stations BS1, BS2 and B3 that perform CoMP may transmit data to the user equipment in cooperative with one another. The CoMP system may be divided into the following schemes depending on data transmission from each base station:

Joint processing (CoMP Joint Processing: CoMP-JP); and
CoMP Cooperative Scheduling/Cooperative beamforming (CoMP-CS/CB).

In case of CoMP-JP, data are simultaneously transmitted from the respective base stations, which perform CoMP, to one user equipment, and the user equipment improves receiving throughput by combining the signals from the respective base stations. In other words, according to the CoMP-JP scheme, data may be used by each point (base station) of CoMP cooperative points. The CoMP cooperative points mean aggregation of base stations used for a cooperative transmission scheme. The JP scheme may be classified into a joint transmission scheme and a dynamic cell selection scheme.

The joint transmission (JT) scheme means that a PDSCH is transmitted from a plurality of points (some or all of CoMP cooperative points) at one time. In other words, data transmitted to a single user equipment may be transmitted from a plurality of transmission points at the same time. According to the joint transmission scheme, quality of a received signal may be improved coherently or non-coherently, and interference on another user equipment may be removed actively.

The dynamic cell selection scheme means that a PDSCH is transmitted from one point (of CoMP cooperation points) at one time. In other words, data transmitted to a single user equipment at a specific time are transmitted from one point. Another point within the cooperative points may not perform data transmission to the corresponding user equipment at the specific time, and the point which transmits data to the corresponding user equipment may be selected dynamically.

On the other hand, in case of CoMP-CS, data are transmitted to one user equipment through one base station at a random moment, and scheduling or beamforming is performed such that interference from the other base stations is minimized. In other words, according to the CoMP CS/CB scheme, CoMP cooperative points may cooperatively perform beamforming of data transmission to a single user equipment. In this case, although the data are transmitted from a serving cell only, user scheduling/beamforming may be determined by coordination of the cells of the corresponding CoMP cooperative point.

In the meantime, in case of an uplink, coordinated multi-point reception means that a signal is received by coordination of a plurality of points locally spaced apart from one another. A CoMP scheme that may be applied to the uplink may be classified into a joint reception (JR) scheme and a coordinated scheduling/beamforming (CS/CB) scheme.

The JR scheme means that a signal transmitted through a PUSCH is received from a plurality of reception points. The CS/CB scheme means that a PUSCH is received from one point only but user scheduling/beamforming is performed by coordination of the cells of the CoMP cooperative point.

Hereinafter, interference among a plurality of cells will be described.

If coverage areas of two base stations are overlapped with each other such as a case that two base stations (for example, base station #1 and base station #2) are arranged to adjoin each other, interference may be caused to a user equipment served by one base station due to a strong downlink signal from another base station. In this way, if inter-cell interference occurs, the inter-cell interference may be reduced through inter-cell cooperative signaling between the two base stations. In various embodiments of the present invention, which will be described hereinafter, it is assumed that signal transmission and reception is performed preferably between two base stations which give and take interference to and from each other. For example, it is assumed that reliability in transmission and reception of a cooperative signal between the base stations is high due to the presence of wire/wireless link (for example, backhaul link or Un interface) having good transmission conditions such as a transmission bandwidth and time delay between the two base stations. Also, it may be assumed that time synchronizations between the two base stations are matched with each other within an allowable error range (for example, downlink subframe boundary of two base stations that give and take interference to and from each other is aligned) or subframe boundary offset between the two base stations is clearly recognized.

Referring to FIG. 8 again, the base station #1 (BS#1) is a macro base station that provides a service to a wide area at a high transmission power, and the base station #2 (BS#2) is a micro base station (for example, pico base station) that provides a service to a narrow area at a low transmission power. As illustrated in FIG. 8, if the user equipment UE located at the cell edge area of the base station #2 and served from the base station #2 is subjected to strong interference from the base station #1, it may be difficult to perform effective communication without proper inter-cell cooperation.

In particular, if the base station #1 which is the macro base station intends to distribute load for service by connecting a plurality of user equipments to the base station #2 which is the micro base station having low power, inter-cell interference is likely to occur. For example, if the user equipment intends to select the serving base station, the user equipment may calculate and compare received powers of downlink signals from the respective base stations in such a way to add a predetermined coordination value (bias value) to the received power from the micro base station and not to add the predetermined coordination value to the received power from the macro base station. As a result, the user equipment may select the base station, which provides the highest downlink received power, as the serving base station. Accordingly, more user equipments may be connected to the micro base station. Even though a signal from the macro base station in downlink signal strength actually received by the user equipment is stronger than the signal from the micro base station, the micro base station may be selected as the serving base station. The user equipment connected to the micro base station may experience strong interference from the macro base station. In this case, the user equipments located at the edge of the micro base station may have a difficulty in performing a normal operation due to strong interference from the macro base station if separate inter-cell cooperation is not provided.

Proper cooperation between the two base stations, which give and take interference to and from each other, may be required to perform an effective operation even in the case that inter-cell interference exists. A signal that enables such cooperative operation may be transmitted and received through a link between the two base stations. In this case, if inter-cell interference occurs between the macro base station and the micro base station, the macro base station may control an inter-cell cooperative operation, and the micro base station may perform a proper operation in accordance with a cooperative signal indicated by the macro base station.

Such occurrence of inter-cell interference is only exemplary, and it will be apparent that the embodiments described in the present invention may equally be applied to even the case where inter-cell interference occurs in other cases (for example, the case where inter-cell interference occurs between HeNB of CSG mode and the macro base station of OSG mode, the case where the micro base station causes interference and the macro base station is subjected to interference, or the case where inter-cell interference occurs between the micro base stations or between the macro base stations).

Moreover, the present invention suggests a method for efficiently reducing and predicting inter-cell interference on time resources and frequency resources if cells dynamically change usage of specific radio resources (for example, uplink resources or downlink resources) allocated to their user equipments to usage of downlink communication or uplink communication in accordance with status change of system load.

First of all, an inter-cell interference coordination (ICIC) scheme for frequency resources under the 3GPP LTE (Rel-8) system will be described. A given frequency domain may be divided into one or more sub-frequency domains (for example, PRB unit) and the following signals for the respective sub-frequency domains may be exchanged between the cells.

RNTP (Relative Narrowband Transmission Power): is a signal indicating a downlink transmission power used in the corresponding sub-frequency domain by the cell that transmits ICIC message. For example, if an RNTP field is set to 0 in a specific sub-frequency domain, it means that a downlink transmission power does not exceed a given threshold value, and if the RNTP field is set to 1, it means that the downlink transmission power cannot be scheduled.

UL IOI (Interference Overload Indication): is a signal indicating the amount of uplink interference caused in the corresponding sub-frequency domain to the cell that transmits ICIC message. For example, if an IOI field is set to high in a specific sub-frequency domain, it means that strong uplink interference occurs in the corresponding domain. In this case, the cell that has received the ICIC message may schedule the user equipment UE that uses the low uplink transmission power, among the user equipments UEs belonging thereto, in the domain where the IOI field is set to high interference, so as to reduce interference to the cell that has transmitted the ICIC message.

UL HII (High Interference Indication): is a signal indicating uplink interference sensitivity for the corresponding sub-frequency domain from the cell that transmits the ICIC message. For example, if an HII field is set to 1 in a specific sub-frequency domain, it may mean that the cell, which transmits the ICIC message, may schedule the user equipment UE of a strong uplink transmission power in the corresponding domain. In this case, the cell that has received the ICIC message may first use the domain where HII is set to 0 in scheduling the user equipment and also use the domain where HII is set to 1 in scheduling the user equipments that may be operated normally even in case of strong interference, thereby avoiding interference from the cell that has transmitted the ICIC message.

However, if the cells dynamically change usage of a specific radio resource in accordance with their system load, communication considering inter-cell interference and an operation for reducing interference cannot be performed efficiently by the aforementioned existing method (for example, RNTP, UL HII, UL IOI) only for inter-cell interference cooperation for the frequency resources.

FIG. 9 illustrates that a specific cell cannot efficiently predict the amount of interference from another cell on the basis of the existing method (for example, RNTP, UL HII, UL IOI) for inter-cell interference cooperation for frequency resources if the cells dynamically change usage of a specific radio resource in accordance with system load. In the present invention, usage change of the radio resource may be defined as "a case where the radio resource is used for the other usage not the usage on uplink-downlink (UL-DL) configuration configured from SIB information", or "a case where the radio resource is used for the other usage not the usage configured at a previous time (based on a radio resource usage change period which is previously set)".

In FIG. 9, it is assumed that two cells exist in the entire network under the TDD system and a specific cell (hereinafter, referred to as cell #A) transmits RNTP and UL HII information, which are based on a previously defined specific threshold value, to another neighboring cell (hereinafter, referred to as cell #B) through an interface X2. It is assumed that the cell #A and the cell #B are set to "DSUUDDSUUD" corresponding to (SIB information based) uplink-downlink (UL/DL) configuration #1, and the cell #A notifies the cell #B of information (or information on locations of radio resource candidates used (semi-)statically) on locations of radio resource candidates of which usage is likely to be dynamically changed through the interface X2. For example, the information on the locations of the radio resource candidates of which usage is likely to be dynamically changed may be configured in the form of a bitmap of a specific length in accordance with a period (or length) which is previously set.

In FIG. 9, it is assumed that the information is configured in the form of a bitmap (that is, '0010000000') of 10 bits. In other words, if a bit of a specific location is set to 1, it indicates that usage of the corresponding radio resource is likely to be changed at high probability. On the other hand, if a bit of a specific location is set to 0, it may indicate that usage of the corresponding radio resource is unlikely to be changed (or usage of the corresponding radio resource is not changed).

However, even though the cell #B receives information on the locations of the radio resource candidates of which usage is likely to be changed (or information on locations of radio resource candidates used (semi-)statically), RNTP, and UL HII from the cell #A as shown in FIG. 9, communication considering the amount of interference from the cell #A at a specific time cannot be performed efficiently. For example, even though the cell #B receives information as to that the cell #A is likely to change usage of radio resources at SF #(n+2) or SF #(n+12), it is uncertain what usage (or purpose) of SF #(n+2) or SF #(n+12) actually changed by the cell #A is. In other words, as shown in FIG. 9, the cell #A uses the corresponding resource, which is notified to the cell #B as the location of the radio resource candidates of which usage is likely to be changed, for uplink communication (as it is), whereas the cell #A may use the corresponding resource for downlink communication at the time of SF #(n+12).

Accordingly, the present invention suggests a method for efficiently reducing and predicting inter-cell interference to correspond to usage change of a specific radio resource if cells dynamically change usage of the specific radio resource in accordance with system load.

Figure 10:
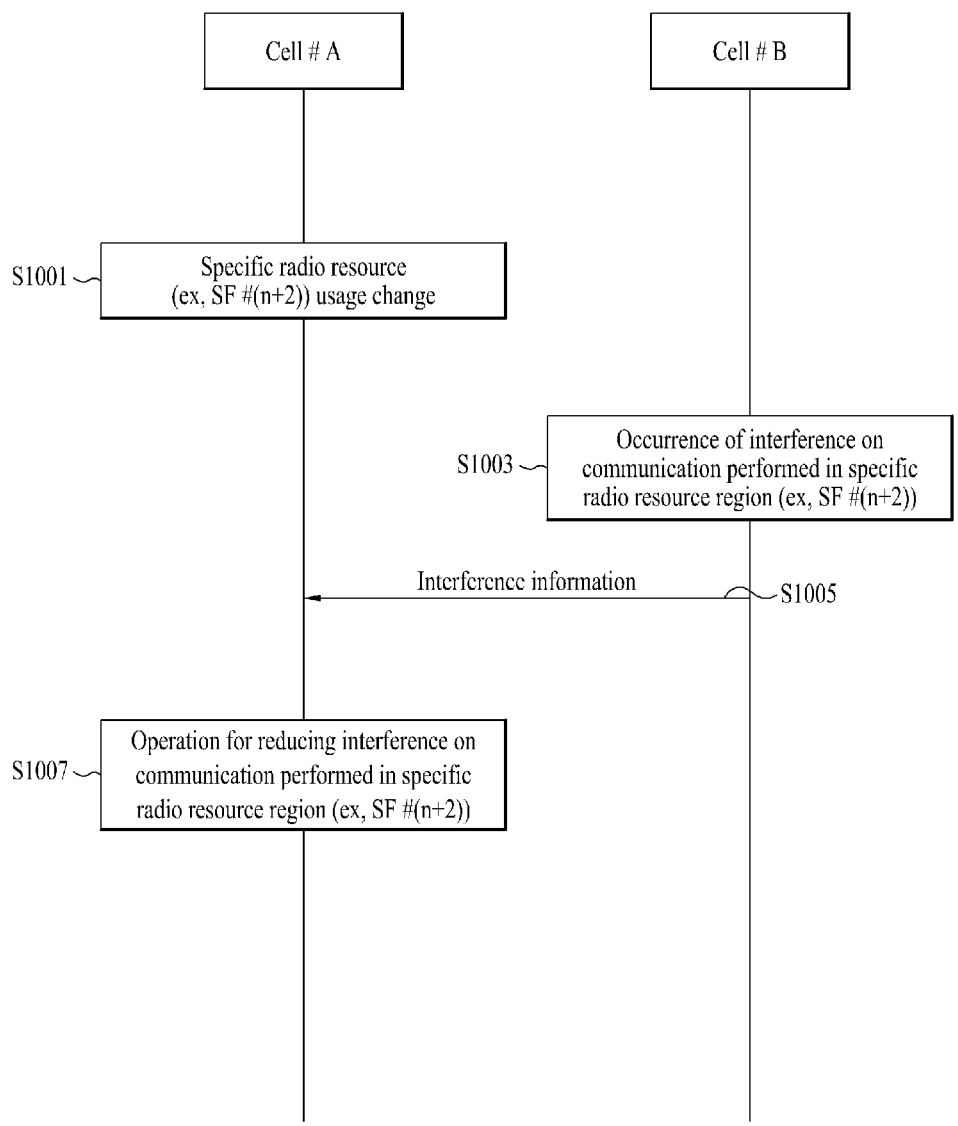
FIG. 10 is a flow chart illustrating a method for reducing inter-cell interference, which is performed in accordance with the present invention.

FIG. 10 is a flow chart illustrating a method for reducing (and predicting) inter-cell interference, which is performed in accordance with the present invention.

Referring to FIG. 10, a serving cell (cell #A) performs communication by dynamically changing usage of a specific radio resource in accordance with system load (S1001). For example, it is assumed that the serving cell has performed downlink communication by changing usage of a radio resource (for example, SF #(n+2)) configured (for example, by UL/UL configuration, etc.) for uplink communication.

In this case, a neighboring cell (cell #B) may identify that interference from the serving cell (cell #A) has occurred, in performing communication by using a specific radio resource, that is, SF #(n+2) (in accordance with UL/DL configuration which is previously set) (S1003).

Accordingly, the neighboring cell transmits interference information on a specific radio resource region to the serving cell (S1005). In the present invention, interference information which is transmitted may be configured differently in accordance with the embodiments, and will be described later.

The serving cell (cell #A) identifies the interference status with the neighboring cell for the specific radio resource region in accordance with the received interference information and performs an operation (for example, transmission power control) for reducing inter-cell interference (S1007).

Hereinafter, the embodiments of the present invention will be described in more detail.

First Embodiment

According to the first embodiment of the present invention, if cells dynamically change usage of a specific radio resource in accordance with their system load, the respective cells may notify their neighboring cells of information on a transmission power of the corresponding resource regardless of usage of the specific radio resource. In more detail, the respective cells may notify their neighboring cells of information as to whether the transmission power of the corresponding resource does not exceed a threshold value which is previously set or information as to whether the serving cell may not assure the transmission power of the corresponding resource through an interface X2 or a specific radio channel which is previously determined.

In the first embodiment of the present invention, power information which is transmitted may be implemented variously in the form of a bitmap. For example, if the bit is set to '1', the power information may be configured such that the transmission power of the corresponding resource region does not exceed a threshold value. On the other hand, if the bit is set to '0', the power information may be configured to indicate that the transmission power of the corresponding resource region cannot be assured (or the transmission power of the corresponding resource region exceeds the threshold value). Also, for example, the threshold value for the transmission power of the specific radio resource may be shared and updated between the cells together with (or independently from) other information through the interface X2 or a specific radio channel, which is previously determined, on the basis of a specific period value which is previously determined.

The information according to the first embodiment of the present invention may be configured for a specific radio resource region only which is used or may be used for communication of different directions between the cells, or may be configured for the entire radio resource region.

Moreover, if interference features of the radio resource regions are different from one another, a plurality of threshold values for the radio resource regions of which interference features are different from one another may (respectively) be set. For example, a threshold value applied to the radio resource region where communication of different directions is likely to be performed between the cells on the basis of radio resource usage configuration information shared between the cells and a threshold value used in the radio resource region where communication in one direction is performed statically or semi-statically may be set independently from each other. At this time, the radio resource region where communication in one direction is performed may be defined by aggregation of downlink subframes (for example, SF #0, SF #1, SF #5 and SF #6 of FIG. 9) for which usage change of the radio resource cannot be performed due to transmission of system information (SIB, MIB (PBCH)) or paging information or synchronization information (PSS, SSS) of the TDD system.

Also, for example, a case where the cell #A and the cell #B respectively use a radio resource of a specific time for downlink communication and uplink communication, and a case where both the cell #A and the cell #B use the radio resource for downlink communication at different times and uplink communication may be assumed. In this case, even though the radio resource is used for downlink in view of the cell #A, since usage of the radio resource of the neighboring cell #B is dynamically changed, interference features for each case may be configured differently, whereby threshold values used in each case may be set independently.

Also, according to the first embodiment of the present invention, if the cells dynamically change usage of the specific radio resource on the basis of a period which is previously set, usage of the radio resource included in (at least) a period region may be used for a dynamically changed usage (or previously configured (fixed) usage). Accordingly, if radio resource usage change information (or radio resource usage configuration information) is shared between the cells by sufficient small delay, threshold values corresponding to the cases that may be configured in different communication directions between the cells may be notified independently.

In other words, according to the present invention, the threshold value for the case where the cell #A uses the specific radio resource region for the purpose of the uplink and the cell #B uses the same for the purpose of the downlink, and the threshold value for the case where the cell #A uses the specific radio resource region for the purpose of the downlink and the cell #B uses the same for the purpose of the uplink may be set independently.

Second Embodiment

If cells dynamically change usage of a specific radio resource in accordance with their system load, the cell which performs uplink communication at a specific time may determine that strong interference occurs from another neighboring cell and may notify the neighboring cell of information on the corresponding resource region subjected to interference. However, since the neighboring cell may perform downlink communication (based on RNTP which is previously shared) not uplink communication at the specific time, this status cannot be controlled efficiently by the existing UL IOI only. This is because that the existing UL IOI is the method for efficiently controlling uplink communication interference between the cells under the status that communication directions between the cells are the same as each other, that is, under the status that uplink communication is performed.

Accordingly, according to the second embodiment of the present invention, if a specific cell performs uplink communication, the specific cell may notify another neighboring cell of information (for example, bitmap), which may indicate a resource region where strong interference occurs regardless of a direction of communication performed by the neighboring cell, through an interface X2 or a specific radio channel which is previously determined.

In this case, the information indicating the resource region where strong interference occurs may be configured in such a manner that a new signal is newly defined or application usage of the existing UL IOI is re-defined. Also, the information according to the second embodiment may be configured for a specific (uplink) radio resource region only which is used or is likely to be used for communication in different directions between cells. Moreover, the information according to the second embodiment may be configured for the entire (uplink) radio resource region. Alternatively, a specific bit (for example, flag bit) may additionally be configured for the existing UL IOI information, whereby the existing UL IOI information may be used as the information according to the second embodiment. Moreover, although the information according to the second embodiment may simply indicate a location of the resource region subjected to strong interference, the information may further include interference level information (for example, low, medium and high level) based on a threshold value which is previously defined.

Information on configuration of the threshold value according to the second embodiment of the present invention may be shared and updated between cells through the interface X2 or a specific radio channel, which is previously determined, together with or independently from other information on the basis of a period value which is previously defined. Also, a threshold value applied to the (uplink) radio resource region where communication in different directions may be performed between the cells on the basis of radio resource usage configuration information shared between the cells and a threshold value used for the (uplink) radio resource region where communication in one direction is performed statically or semi-statically may be configured independently from each other.

Moreover, the specific cell subjected to uplink communication may notify its neighboring cell of the amount of (maximum) interference (or uplink/downlink transmission power of neighboring cell) required to normally perform its uplink communication together with the information according to the second embodiment of the present invention. For example, the amount of maximum (or threshold) interference or uplink/downlink transmission power of the neighboring cell may be shared and updated between the cells through the interface X2 or a specific radio channel which is previously determined.

Third Embodiment

If cells dynamically change usage of a radio resource in accordance with their system load, since a specific cell uses the radio resource by dynamically changing usage of the radio resource, the specific cell cannot exactly identify a cause of interference by using (existing) interference information (for example, UL IOI) only notified from a neighboring cell subjected to (relatively high) interference therefrom.

Accordingly, according to the third embodiment of the present invention, the specific cell subjected to (relatively high) interference from the neighboring cell may configure interference information on the corresponding resource region, wherein the interference information may indicate a direction of communication performed by the specific cell under strong interference from the neighboring cell.

For example, information according to the third embodiment of the present invention may indicate two kinds of independent interference information (or interference signals) respectively indicating a case where interference occurs under the status that uplink communication is performed and a case where interference occurs under the status that downlink communication is performed. Interference information occurring under the status that uplink communication is performed may be defined as IOI_UL, and interference information occurring under the status that downlink communication is performed may be defined as IOI_DL.

For example, the specific cell that has received IOI_UL from the neighboring cell may control its downlink communication power because its downlink communication operation performed in a specific radio resource region is likely to affect relatively high interference uplink communication (that is, uplink data reception of the base station) of the neighboring cell. On the other hand, the specific cell that has received IOI_DL from the neighboring cell may control its uplink communication power since its uplink communication operation performed in a specific radio resource region is likely to affect (relatively high) interference uplink communication (that is, downlink data reception of the user equipment) of the neighboring cell.

Preferably, the interference information (or configuration on interference information) according to the present invention may be shared and updated between cells through an interface X2 or a specific radio channel, which is previously determined. Also, the specific cell subjected to (relatively high) interference from the neighboring cell in accordance with the present invention may configure interference information on the corresponding resource region, wherein the interference information may indicate the radio resource based communication status of the specific cell under strong interference from the neighboring cell. For example, the corresponding information may be represented by two kinds of independent interference information (or interference signals) respectively indicating a case where interference occurs under the status that radio resource based communication to which dynamic change is applied is performed and a case where interference occurs under the status that radio resource based communication to which dynamic change is not applied is performed.

Fourth Embodiment

If cells dynamically change usage of a radio resource in accordance with their system load, a specific cell, which performs communication, is required to notify a neighboring cell of interference information on a corresponding resource region when the specific cell is subjected to (relatively high) interference from the neighboring cell. However, since the neighboring cell that has received the interference information notified from the specific cell uses the radio resource by dynamically changing usage of the radio resource, the neighboring cell cannot exactly identify its direction of communication that causes (relatively high) interference.

Accordingly, according to the fourth embodiment of the present invention, the specific cell subjected to interference from the neighboring cell notifies the neighboring cell of statistical information (or statistical information on the number of times of relatively high interference within a specific time interval (domain) which is previously defined) corresponding to a case where relatively high interference occurs within a specific time interval (domain) which is previously defined, together with interference information or interference signal (for example, IOI). Preferably, configuration information on the specific time interval (domain) may be shared and updated between cells through an interface X2 (or a specific radio channel which is previously determined) on the basis of a specific period value which is previously determined.

According to the fourth embodiment of the present invention, statistical information (or statistical information on the number of times of relatively high interference within a specific time interval (domain) which is previously defined) on a specific time interval corresponding to a case where interference occurs may be calculated on the basis of an interference threshold value which is previously defined. Likewise, the corresponding threshold value may be shared and updated between cells through the interface X2 (or a specific radio channel which is previously determined) on the basis of a specific period value which is previously determined.

Accordingly, the neighboring cell that has received the information according to the fourth embodiment of the present invention may identify a direction of communication within a specific time interval (domain), which causes interference to another cell, on the basis of statistical information in view of probability. For example, the neighboring cell may compare the number of times of uplink or downlink communication performed by itself within a specific time interval (domain) with the statistical information received from the specific cell, and then may identify its direction of communication, which causes interference to another cell, in view of probability. Accordingly, the neighboring cell may perform an operation for reducing interference (for example, transmission power control) for communication in the corresponding direction at the radio resource region on the basis of the information according to the fourth embodiment of the present invention.

For example, it is assumed that a specific time interval value used for configuration of statistical information is set to 10 ms and cell #A has used the radio resource as usage of "DSUDDDSUDD" within the corresponding time interval (domain). Under the circumstances, cell #B may notify the cell #A of statistical information indicating "8" together with interference information (or interference signal) on the radio resource region subjected to interference.

Accordingly, the cell #A may identify the status that its downlink communication causes interference (exceeding a threshold value which is previously defined) to the cell #B, on the basis of "8" (that is, the cell #A has used the radio resource as "DSUDDDSUDD" within a specific time interval (domain) and "8" which is statistical information received from the cell #B means eight downlink subframes used by the cell #A within the corresponding time interval (domain)) which is statistical information received from the cell #B. If the cell #A receives interference information (or interference signal) and statistical information indicating "2" (that is, the cell #A has used the radio resource as "DSUDDDSUDD" within a specific time interval (domain) and "2" which is statistical information received from the cell #B means two uplink subframes used by the cell #A within the corresponding time interval (domain)) from the cell #B, the cell #A may identify the status that its uplink communication causes interference (exceeding a threshold value which is previously defined) to the cell #B.

Accordingly, the cell #A may perform the operation for reducing interference (for example, transmission power control) for communication performed in the resource region determined that interference has been caused, by using interference information (or interference signal) and statistical information.

Fifth Embodiment

If cells dynamically change usage of a radio resource in accordance with their system load, a specific cell, which performs communication, is required to notify a neighboring cell of interference information on a corresponding resource region when the specific cell is subjected to (relatively high) interference from the neighboring cell.

However, since the neighboring cell that has received the interference information notified from the specific cell uses the radio resource by dynamically changing usage of the radio resource, the neighboring cell cannot exactly identify its direction of communication that causes (relatively high) interference.

Accordingly, according to the fifth embodiment of the present invention, the specific cell subjected to interference from the neighboring cell notifies the neighboring cell of information on a location (or timing) of the radio resource, which is actually subjected to interference, within a specific time (or period) which is previously defined when configuring and transmitting interference information or interference signal (for example, IOI) on the radio resource region subjected to interference.

Interference information according to the fifth embodiment of the present invention may be calculated on the basis of a specific time (or period) which is previously defined, and specific time (or period) related information may be shared and updated between cells through an interface X2 (or a specific radio channel which is previously determined) (on the basis of a specific period value which is previously determined).

Also, according to the fifth embodiment of the present invention, interference information may be calculated on the basis of an interference threshold value which is previously defined. Likewise, the corresponding threshold value may be shared and updated between cells through the interface X2 (or a specific radio channel which is previously determined) on the basis of a specific period value which is previously determined.

Accordingly, according to the fifth embodiment of the present invention, the neighboring cell that has received the information on the radio resource location which is actually subjected to interference on a specific time (or period) may identify a direction of communication, which causes interference to another cell, by identifying communication performed by itself on the corresponding radio resource region corresponding to the specific time (or period). For example, if a specific time (or period) which is previously set is 10 ms and cell #A uses the radio resource as "DSUDDDSUDD", and if interference information received from cell #B indicates "2", the cell #A may identify that interference has occurred at SF#(n+2) corresponding to the specific time and the radio resource. Accordingly, the cell #A may perform the operation for reducing interference (for example, transmission power control) for communication in the corresponding direction in the corresponding radio resource region on the basis of the identified information.

The present invention may be limited to radio resource candidates of which usage is likely to be dynamically changed, wherein the radio resource is previously shared between the cells. Moreover, the present invention may be used for resources in a fixed communication direction set (equally) between the cells or a radio resource region for at least one of uplink and downlink. Accordingly, according to the present invention, each cell may (relatively exactly) predict the amount of interference occurring in a specific radio resource region from a neighboring cell even though neighboring cells dynamically change usage of the specific radio resource in accordance with system load, whereby efficient communication may be performed considering the predicted interference.

The present invention may be applied to even the status that information on radio resource (candidate) location which will be changed statically or semi-statically is shared between the cells as well as the status that information on radio resource candidates of which usage is likely to be changed is shared between the cells. For example, the information on radio resource (candidate) location may be configured in the form of an indicator (or bitmap) for radio resource candidates having relatively high probability in change of usage of the radio resource and an indicator (or bitmap) for radio resource candidates having relatively low probability in change of usage of the radio resource.

Also, for example, the radio resource candidates having high probability in change of usage of the radio resource may be configured semi-statically and the radio resource candidates having low probability in change of usage of the radio resource may be configured statically. In this way, the information on the radio resource candidates may be configured semi-statically and statically. In other words, the radio resource candidates may be configured using a plurality of indicators or bitmaps in accordance with the embodiments of the present invention. Preferably, the information on the radio resource candidates having low probability in change of usage of the radio resource may be configured differently from the information on the radio resource (candidate) location of which usage is not changed.

Additionally, according to the present invention, the embodiments of the present invention may be used independently for a specific radio communication channel (for example, PUCCH, PUSCH, PDCCH, PDSCH), whereby interference cooperative operation may be performed more efficiently between the cells.

Also, although the individual embodiments of the present invention may be implemented independently, they may be implemented in combination.

Radio resource region sets having different interference features may be generated in accordance with the present invention, and a specific cell may configure different channel information measurement sets (or different interference information measurement sets) (that is, a kind of Restricted CSI Measurement Set or Resource-Specific CSI Measurement Set) on the basis of the radio resource region sets (or configurations) and forward the configured different channel information measurement sets to user equipments which perform communication therewith.

The present invention may be applied to all the statuses that ICIC on a frequency resource or ICIC on a time resource are used independently as well as the status that ICIC (for example, zero power ABS, reduced power ABS) on frequency and time resources coexist.

Also, the aforementioned embodiments of the present invention may be limited to a case where a radio resource dynamic change mode is set.

Also, the present invention may be applied to a case where ICIC on at least one of a frequency resource and a time resource is used under a carrier aggregation (CA) environment (for example, case where interference occurs between intra bands). In other words, the present invention may be applied to even a case where radio resource usage change is performed independently per subcarrier (component carrier, CC) (or per cell) under the CA environment. Also, the present invention may be used for operation for efficiently reducing interference between systems that share a corresponding resource region if a non-licensed band or extended spectrum (for example, extension carrier) is used for CA operation. Also, the present invention may be used for operation for efficiently reducing interference between communication between user equipments and communication between base station and user equipment under the status that communication between user equipments (device-to-device communication) is performed.

Figure 11:
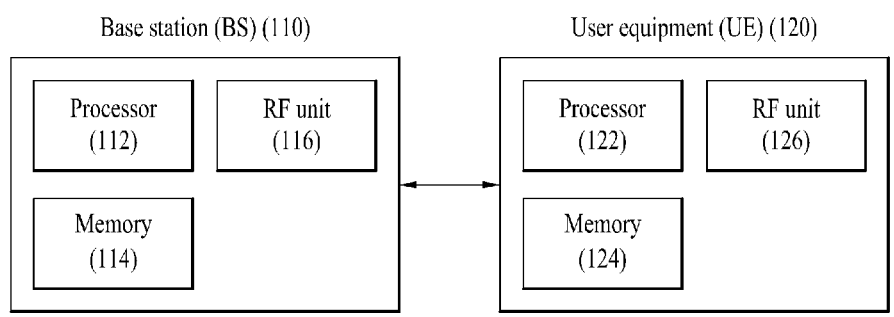
FIG. 11 is a diagram illustrating a base station and a user equipment, which may be applied to the embodiment of the present invention.

FIG. 11 is a diagram illustrating a base station and a user equipment, which may be applied to the embodiment of the present invention. If a relay is included in a wireless communication system, communication in a backhaul link is performed between the base station and the relay and communication in an access link is performed between the relay and the user equipment. Accordingly, the base station or the user equipment as shown may be replaced with the relay depending on the circumstances.

Referring to FIG. 11, the wireless communication system includes a base station (BS) 110 and a user equipment (UE) 120. The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method for reducing inter-cell interference in a wireless communication system and the apparatus for the same have been described based on the 3GPP LTE system, the method and apparatus may be applied to various wireless communication systems in addition to the 3GPP LTE system.

The invention claimed is:

1. A method for reducing inter-cell interference of a serving cell in a cooperative multi-cell wireless communication system, the method comprising the steps of:
  reconfiguring, by the serving cell, a specific subframe as a downlink subframe, the specific subframe being one subframe among plural uplink subframes configured by a SIB (system information block);
  receiving, by the serving cell, interference information on the specific subframe from a neighboring cell via an X2 interface,
  wherein the interference information is configured in the form of a bitmap represented by 10 bits; and
  reducing, by the serving cell, interference with respect to the specific subframe on the basis of the interference information.

2. The method according to claim 1, further comprising the step of transmitting transmission power information for the specific subframe to the neighboring cell.

3. The method according to claim 2, wherein the transmission power information includes information on a threshold value set in accordance with interference features of the specific subframe.

4. The method according to claim 1, wherein the interference information is UpLink Interference Overload Indication (UL IOI) that includes information indicating interference level in the specific subframe.

5. The method according to claim 1, wherein the interference information includes information on the amount of interference for allowing the neighboring cell to perform uplink communication in the specific subframe.

6. The method according to claim 1, wherein the interference information is received from a neighboring cell that performs uplink communication.

7. The method according to claim 1, wherein the interference information includes information indicating uplink or downlink on communication performed by the neighboring cell in the specific subframe.

8. The method according to claim 1, wherein the interference information includes information on the number of times of communication performed by the neighboring cell in a specific time interval, and the number of times of communication is for at least one of uplink communication and downlink communication.

9. The method according to claim 1, wherein the interference information is information indicating a specific time on a time period corresponding to the specific subframe.

10. The method according to claim 1, wherein the step of reducing interference is performed by controlling a transmission power configured with respect to the specific subframe.

11. A serving cell for reducing inter-cell interference in a cooperative multi-cell wireless communication system, the serving cell comprising:
  a radio frequency (RF) unit; and
  a processor configured to:
    reconfigure a specific subframe as a downlink subframe, the specific subframe being one subframe among plural uplink subframes configured by a SIB (system information block),
    receive interference information on a specific subframe from a neighboring cell via an X2 interface,
    wherein the interference information is configured in the form of a bitmap represented by 10 bits, and
    reduce interference with respect to the specific subframe on the basis of the interference information.

12. The serving cell according to claim 11, wherein the processor is further configured to transmit transmission power information for the specific subframe to the neighboring cell.

13. The serving cell according to claim 12, wherein the transmission power information includes information on a threshold value set in accordance with interference features of the specific subframe.

14. The serving cell according to claim 11, wherein the interference information is UpLink Interference Overload Indication (UL IOI) that includes information indicating interference level in the specific subframe.

15. The serving cell according to claim 11, wherein the interference information includes information on the amount of interference for allowing the neighboring cell to perform uplink communication in the specific subframe.

16. The serving cell according to claim 11, wherein the interference information is received from a neighboring cell that performs uplink communication.

17. The serving cell according to claim 11, wherein the interference information includes information indicating uplink or downlink on communication performed by the neighboring cell in the specific subframe.

18. The serving cell according to claim 11, wherein the interference information includes information on the number of times of communication performed by the neighboring cell in a specific time interval, and the number of times of communication is for at least one of uplink communication and downlink communication.

19. The serving cell according to claim 11, wherein the interference information is information indicating a specific time on a time period corresponding to the specific subframe.

20. The serving cell according to claim 11, wherein the processor is further configured to reduce interference is performed by controlling a transmission power configured with respect to the specific subframe.

* * * * *